(12) United States Patent
Xiao et al.

(10) Patent No.: US 10,235,234 B2
(45) Date of Patent: Mar. 19, 2019

(54) METHOD AND APPARATUS FOR DETERMINING FAILURE SIMILARITY IN COMPUTING DEVICE

(71) Applicant: EMC IP HOLDING COMPANY LLC, Hopkinton, MA (US)

(72) Inventors: Huibing Xiao, Beijing (CN); Jian Gao, Beijing (CN); Geng Han, Beijing (CN); Jibing Dong, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 15/384,597

(22) Filed: Dec. 20, 2016

(65) Prior Publication Data
US 2017/0185467 A1  Jun. 29, 2017

(30) Foreign Application Priority Data
Dec. 29, 2015 (CN) .......................... 2015 1 1018824

(51) Int. Cl.
*G06F 11/00* (2006.01)
*G06F 11/07* (2006.01)
*G06F 11/36* (2006.01)

(52) U.S. Cl.
CPC ........ *G06F 11/079* (2013.01); *G06F 11/0751* (2013.01); *G06F 11/0778* (2013.01); *G06F 11/3636* (2013.01)

(58) Field of Classification Search
CPC ............. G06F 11/3636; G06F 11/0778; G06F 11/0766; G06F 11/079
See application file for complete search history.

(56) References Cited

U.S. PATENT DOCUMENTS

| | | | | |
|---|---|---|---|---|
| 2003/0005414 A1* | 1/2003 | Elliott | ................. | G06F 11/0715 717/128 |
| 2004/0054991 A1* | 3/2004 | Harres | ................ | G06F 11/3664 717/131 |
| 2011/0258604 A1* | 10/2011 | Drukman | ............ | G06F 11/3636 717/125 |
| 2014/0258990 A1* | 9/2014 | Klic | .................... | G06F 11/3636 717/128 |

* cited by examiner

*Primary Examiner* — Charles Ehne
(74) *Attorney, Agent, or Firm* — BainwoodHuang (57) ABSTRACT

Embodiments of the present disclosure provide a method and an apparatus for a computing device. The computing device may generate stacks for crash dump in response to failures, each of the stacks may include a plurality of stack frames from bottom to top, and each of the stack frames may include function information associated with a corresponding failure. The method may include: extracting corresponding function name information from the stack frames in the stacks; generating simplified stack frames based on the corresponding function name information to obtain simplified stacks for the stacks; and determining a similarity between the failures based on a similarity between the simplified stacks of the failures.

17 Claims, 4 Drawing Sheets

```
(gdb)bt
#0  0x00007f6f735e3b35 in raise ()
from/tmp/abcdt/a/564217-spa_FNM00131203264_2013-10-11_17_14_08_8666/lib64/libc.so.6
#1  0x00007f6f735e5111 in abort ()
from/tmp/abcdt/a/564217-spa_FNM00131203264_2013-10-11_17_14_08_8666/lib64/libc.so.6
#2  0x00007f6f74ac04d7in csx_rt_proc_do_abort ()
   at ../../../../../csx/csxroot/src/csx_infra/csx_rt/csx_osll/csx_rt_proc.c:2450
#3  0x00007f6f74a57966 in csx_rt_assert_int_take_user_space_panic_action (
   panic_action=1)
   at ../../../../../csx/csxroot/src/csx_infra/csx_rt/csx_rt_misc/csx_rt_assert.c:786
#4  0x00007f6f74a57d13 in csx_rt_assert_request_panic_with_info (
   failure_state_info=0x1,
   file=0x7f6f7083d6b0"/c4_working/Coding/KH_sandbox-kpi/safe/catmerge/EmcPAL/Driver/
   EmcPAL_Misc.c",
   line=73, argcount=6,
   format=0x7f6f7083d678 "bugcheck: %08x [%08llx] [%08llx] [%08llx] [%08llx]\n")
   at ../../../../../csx/csxroot/src/csx_infra/csx_rt/csx_rt_misc/csx_rt_assert.c:960
#5  0x00007f6f70835502 in EmcpalBugCheck (BugCheckCode=0,
   BugCheckParameter1=0, BugCheckParameter2=100663296, BugCheckParameter3=1,
   BugCheckParameter4=0)
   at /c4_working/Coding/KH_sandbox-kpi/safe/catmerge/EmcPAL/Driver/EmcPAL_Misc.c:68
   ......
#28  0x00007f6f74a6732c in csx_rt_cpi_thread_command (thr_context=0xf380fc0)
   at ../../../../../csx/csxroot/src/csx_infra/csx_rt/csx_rt_cp/csx_rt_cpi.c:178
#29  0x00007f6f74a2a7f4 in csx_rt_sked_thread_wrapper (context=0xf381090)
   at ../../../../../csx/csxroot/src/csx_infra/csx_rt/csx_rt_sked/csx_rt_sked_llp_uu.c:914
#30  0x00007f6f73e43d96 in start_thread ()
   from /tmp/abcdt/a/564217-spa_FNM00131203264_2013-10-11_17_14_08_8666/lib64/
   libpthread.so.0
#31  0x00007f6f7368ac5d in clone ()
   from /tmp/abcdt/a/564217-spa_FNM00131203264_2013-10-11_17_14_08_8666/lib64/libc.so.6
```

METHOD AND APPARATUS FOR DETERMINING FAILURE SIMILARITY IN COMPUTING DEVICE

RELATED APPLICATIONS

This application claim priority from Chinese Patent Application Number CN201511018824.2, filed on Dec. 29, 2015 at the State Intellectual Property Office, China, titled "METHOD AND APPARATUS FOR COMPUTING DEVICE," the contents of which is herein incorporated by reference in its entirety

TECHNICAL FIELD

The embodiments of the present disclosure generally relate to the technical field of a computing device, and more specifically relate to a method and an apparatus for determining failure similarity in a computing device.

BACKGROUND

During an operation procedure of a computing device, when an abnormal event or accident occurs, a user or a system may perform crash dump to save useful context information. In crash dump, stacks for crash dump is one of most important information or signatures for crash dump, and indicates a direct cause of a failure occurring to a computing system/process. Stack frame backtracking with respect to stacks for crash dump may provide a unique explicit sequence of calling a code path that leads to occurrence of crash dump.

For a system under a heavy test, many crash dumps having similar stacks may be generated, and it is likely always needed to determine whether a new crash dump is associated with other crash dumps that are being analyzed or have been analyzed, so as to avoid repetitive work by referring to the analysis of other crash dumps.

However, such a determination is not an easy job, because even a similar code path is present in stacks for crash dump, it is nearly impossible to find a completely matched crash dump. This is because there are always many discrepancies or noises in stacks for crash dump. It is also the same situation for some other external communities. For example, when searching common and complete stacks for crash dump of Linux/Windows open source applications or kernel using popular web page browsers with a strong search engine (e.g., Google, Baidu, etc.), usually no useful results can be found.

In the existing solutions, because a complete text of stacks for crash dump for each individual generally includes much noise information, in order to determine a similarity between two crash dumps, it may be needed a typical classification algorithm (e.g., Bayesian classification algorithm) to construct a specifically customized full-text search engine.

However, such approach has a drawback of introducing much noise (from a variable part of the stack text), and also losing the calling order information in the stacks. Even the latter can be amended by considering a ranking or an order of words in the stack text, but if the number of crash dumps is very large, the computational cost will also increase accordingly. Because it is needed to compare the given stack file with all of the existing stack files.

Besides, such approach also introduces a very large complexity which makes it hard to be implemented and run fast on a computer work station with limited resources. In addition, a similarity derived according to such approach cannot provide a simple understanding of a failure-related problem, because it only takes individual words into account and loses complete context information.

SUMMARY

In view of the above problems existing in the prior art, one object of the embodiments of the present disclosure is to provide a method and an apparatus for a computing device to solve the above and other problems in the prior art.

According to a first aspect of the present disclosure, there is provided a method for a computing device. The computing device may generate stacks for crash dump in response to failures, each of the stacks may include a plurality of stack frames from bottom to top, and each of the stack frames may include function information associated with a failure. The method may include: extracting corresponding function name information from the stack frames in the stacks; generating simplified stack frames based on the corresponding function name information to obtain simplified stacks for the failures; and determining a similarity between the failures based on a similarity between the simplified stacks for the failures.

According to some embodiments of the present disclosure, generating simplified stack frames based on the corresponding function name information for the stack frames may include: generating simplified stack frames only based on the corresponding function name information for the stack frames.

According to some embodiments of the present disclosure, generating simplified stack frames based on the corresponding function name information for the stack frames may include: generating the simplified stack frames based on the corresponding function name information and corresponding module name information for the stack frames.

According to some embodiments of the present disclosure, the method may further include: extracting the corresponding module name information from the stack frames, or determining the corresponding module name information by looking up function address information in the stack frames.

According to some embodiments of the present disclosure, the method may further include: setting separators between the corresponding function name information and the corresponding module name information in the simplified stack frames.

According to some embodiments of the present disclosure, determining a similarity between the failures based on a similarity between the simplified stacks includes: removing the simplified stack frames one by one from bottom towards top till only the simplified stack frame at the top is left, a sub-stack being generated in response to one of the simplified stack frames being removed; and determining the similarity between the failures based on a similarity between the simplified stacks and a similarity between the sub-stacks of the simplified stacks.

According to some embodiments of the present invention, the method further includes: determining the similarity between failures based on common simplified stacks of the failures or the sub-stacks having a largest number of common simplified stack frames.

According to some embodiments of the present disclosure, the method may further include: obtaining simplified stacks and sub-stacks of the simplified stack for a plurality of failures; and generating a mapping table between the simplified stacks for the plurality of failures and the plurality of failures, and between the sub-stacks and the plurality of failures.

According to some embodiments of the present disclosure, determining a similarity between the failures based on a similarity between the simplified stacks may include: obtaining simplified stacks and sub-stacks of the simplified stacks for a new failure; and searching for the simplified stacks and the sub-stacks of the simplified stacks for the new failure from the mapping table to determine a failure having same simplified stacks or sub-stacks as the new failure.

According to some embodiments of the present disclosure, the method may further include: adding into the mapping table the simplified stacks and the sub-stacks for the new failure that are missed in the mapping table into the mapping table.

According to some embodiments of the present disclosure, the method may further include: generating the mapping table using a Hash algorithm.

According to a second aspect of the present disclosure, there is provided an apparatus for a computing device. The computing device may generate stacks for crash dump in response to failures, each of the stacks may include a plurality of stack frames from bottom to top, and each of the stack frames may include function information associated with a corresponding failure. The apparatus may include: an extracting unit configured to extract corresponding function name information from the stack frames in the stacks; a simplifying unit configured to generate simplified stack frames from the stacks frames based on the corresponding function name information to obtain simplified stacks for the failure; and a similarity determining unit configured to determine a similarity between the failures based on a similarity between the simplified stacks for the failures.

According to a third aspect of the present disclosure, there is provided a computer readable storage medium with a computer-readable program instruction stored thereon to perform the method according to the first aspect.

According to a fourth aspect of the present disclosure, there is provided a computer system including the apparatus according to the second aspect.

The embodiments of the present disclosure provide a fast manner with low-complexity to determine whether stacks for a given crash dump have a higher similarity with stacks for another crash dump, and if such stacks for crash dump exists, an optimal crash dump list may be derived and the impact of discrepancy or noise in the stacks for crash dump may be eliminated.

The method provided in the embodiments of the present disclosure is efficient and the result obtained can provide a similarity between crash dumps more accurately. With the method and apparatus provided, similar stacks for crash dump can be found efficiently, without constructing a customized full-text search engine for a stack text to search; and by deleting stack frames one by one according to time sequence of the original stack frames in the stacks for crash dump, a plurality of sub-stacks are formed, such that the formed sub-stacks will not lose key time sequence information in the original stack frames. Besides, the similarity between failures can be easily quantized to filter for other analysis.

BRIEF DESCRIPTION OF THE DRAWINGS

By reading detailed description below with reference to the accompanying drawings, the above and other objects, features, and advantages of the embodiments of the present disclosure will become readily comprehensible. In the drawings, a plurality of embodiments of the present disclosure are shown in an exemplary but non-limitative manner, wherein:

FIG. 1 schematically shows typical stacks for crash dump consisting of original stack frames.

DETAILED DESCRIPTION OF EMBODIMENTS

Hereinafter, the principle and spirit of the present disclosure will be described with reference to a number of exemplary embodiments shown in the drawings. It should be understood that these specific embodiments are described only for enabling those skilled in the art to better understand and implement the present disclosure, not for limiting the scope of the present disclosure in any manner.

FIG. 1 schematically shows a typical stack 10 for crash dump consisting of original stack frames. As mentioned above, upon occurrence of crash dump, the stacks for crash dump is one of the most important information or signatures for crash dump and indicate a direct cause for failure of a computing system/process. Stack frame backtracking of stacks for crash dump may provide a unique explicit sequence of calling a code path that results in occurrence of crash dump.

As illustrated in FIG. 1, the exemplary stack 100 for crash dump may include original stack frames #31 to #0 from bottom to top, and each original stack frame may include failure-related function information. For instance, the #0 stack frame includes the associated information of the failure-related function Raise. For the sake of clarity, FIG. 1 only exemplarily shows the original stack frames #0 to #5 and #28 to #31, and omits the original stack frames #6 to #27. Those skilled in the art may understand that the original stack frames #6 to #27 may have a similar structure and content to the original stack frames shown.

The original stack 100 for crash dump may provide full detail information related to a code path of a stack for a failure, however, a similarity between stacks for crash dump can hardly be found through the full detail information, because most contents included in each stack frame of stack backtracking will always change at each time of the program/process compiling, loading and analyzing. For example, the stack 100 for crash dump comprises parts underlined which are associated with addresses of the stack frames and may change in response to performing module loading, the code lines and directory information will also possibly change in each real-time system or troubleshooting system context.

In operations related to the computing device, it is always possible needed to determine whether the new crash dump has a higher similarity with other crash dumps that are being analyzed or have been analyzed so as to avoid repetitive work by referring to analysis of other crash dumps. This needs an efficient and simple manner to find similar stacks for crash dumps in a large-yield system that possibly generate many crash dumps (e.g., an order of millions), and to find the stacks for crash dumps with the highest similarity, while the results can also be easily understood.

From the perspective of algorithm, it is a pure text similarity computation problem. Generally, a search engine or a similar tool can be used to index a stack text based on the words in the text, and then compute, during a process of searching a given stack text, a cosine similarity between word vectors of the given stack text and word vectors of all other stacks for crash dumps. As discussed above, the method in the prior art has various defects.

Various embodiments of the present disclosure provide a fast manner with low-complexity to determine whether stacks for a given crash dump has a high similarity with stacks for another crash dump; if such stacks for crash dump exists, an optimal crash dump list may be derived, and impact of discrepancies or noises in the stacks for crash dump may be eliminated.

The method provided in various embodiments of the present disclosure is efficient and the results obtained can embody a good understanding of crash dump. With the method provided, similar stacks for crash dump can be efficiently found without constructing a customized full text search engine for the stack text to search.

Figure 2:
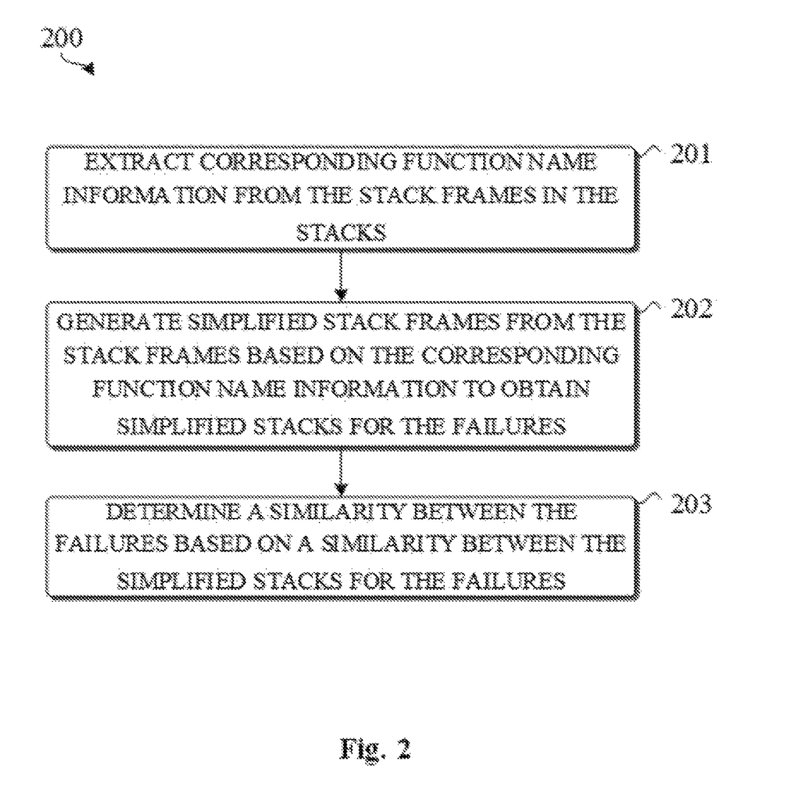
FIG. 2 schematically shows a flow diagram of the method according to the embodiments of the present disclosure.

FIG. 2 schematically illustrates a flow diagram of a method 200 according to embodiments of the present disclosure. In some embodiments, the method 200 may be used for a computing device, the computing device may generate stacks for crash dump in response to failures; each of the stacks may include a plurality of stack frames from bottom to top; each stack frame may include function information related to the failure. In some embodiments, an executive body for the method 200 may be an entity associated with the computing device. In some specific embodiments, the executive body of the method 200 may be an apparatus 300 that will be described in conjunction with FIG. 3.

As illustrated in FIG. 2, the method 200 may proceed to block 201 after start. In block 201, the executive body of the method 200 may extract corresponding function name information from the stack frames in the stacks.

In specific embodiments, an original stack frame that causes crash dump may be selected and be processed as follows. First, information that is always varied and is not so important is removed from each original stack frame, with only function name information of each original stack frame being left. For example, such removable information may include: numbers in the original stacks, such as function address, which will vary in response to module loading, and parameters delivered using run time of the context, and source code directory and line information during compilation time, etc.

In some specific embodiments, for the stack 100 shown in FIG. 1, corresponding function name information may be extracted from stack frames #0 to #5: raise, abort, csx_rt_proc_do_abort, sx_rt_assert_int_take_user_space, panic_action, csx_rt_assert_request_panic_with_info, and Emcpal-BugCheck. Further, corresponding function name information may be extracted from stack frames #28 to #31: csx_rt_cpi_thread_command, csx_rt_sked_thread_wrapper, start_thread, and clone.

Next, the method 200 may proceed to block 202. In block 202, the executive body of the method, 200 may generate the corresponding simplified stack frames based on corresponding function name information to obtain simplified stacks for the failures.

In some embodiments, the simplified stack frames may be generated only based on the corresponding function name information for the stack frames. Those skilled in the art may understand that in the stack frames of the stacks for crash dump, the function name information associated with the failures may better embody the correlation between two failures. Therefore, in a simple implementation way of the method 200, simplified stack frames of stack frames may be generated only based on function name information of stack frames, while original time sequence of stack frames of the stacks for crash dump is reserved, so as to obtain the simplified stacks for failure through the corresponding simplified stack frames of stack frames.

In some other embodiments, simplified stack frames may also be generated based on corresponding function name information and corresponding module name information for the stack frames. Then, by reserving the original time sequence of stack frames in the stacks for crash dump, simplified stacks of the stacks for failures may be derived using the corresponding simplified stack frames for stack frames. In these embodiments, besides the function name information, the simplified stack frames may also include corresponding module name information. This is always helpful, because a same function may be statically associated with different modules, and it is possibly advantageous to determine which module has a problem in the stacks.

Module name information associated with the function for failure may be obtained in different manners. In some embodiments, if the stack frames include relevant module name information, then the method 200 may include: extracting corresponding module name information from the stack frames.

If the module name information cannot be extracted from the stack frames, this is always related to a checking/troubleshooting situation. In some embodiments, corresponding module name information may be determined by looking up function address information from stack frames. Specifically, it may be derived to which module the function address belongs from some other sources by looking up this function address from the addresses for crash dump of the module.

In a specific exemplary embodiment, for the stack frame #2 shown in FIG. 1, it may be seen that its function address is 0x00007f6f74ac0d7, and its function name information is csx_rt_proc_do_abort. Based on this information, by performing crash dump to all crash dump address spaces, it can be determined that the function address 0x00007f6f74ac0d7 falls into the range of 0x00007f6f4a13cc0-0x00007f6f74b5bab8. It is known by query that this range is a .text area of csx_urt.so. This process may be expressed by code as follows.

```
(gdb) info files
Symbols from
"/disks/USD_dumps15/ARs/0564000-0564999/564217/10-11-2013/EMC/csx/ubin
64/ csx_ic_std.x".
    Local core dump file:
        '/tmp/abcdt/a/564217-spa_FNM00131203264_2013-10-11_17_14_08_8666/s
afe_dump_spa_FNM00131203264_2013-10-11_17_14_08_8666_safe', file type
elf64-x86-64.
        0x0000000000400000 - 0x0000000000404000 is load1
```

```
    0x0000000000603000 - 0x0000000000604000 is load2
...
    0x00007f6f74a111a8  -  0x00007f6f74a13cb8  is  .plt  in
/tmp/abcdt/a/564217-spa_
FNM00131203264_2013-10-11_17_14_08_8666/EMC/csx/ulib64/csx_urt.so
    0x00007f6f74a13cc0  -  0x00007f6f74b5bab8  is  .text  in
/tmp/abcdt/a/564217-spa_
FNM00131203264_2013-10-11_17_14_08_8666/EMC/csx/ulib64/csx_urt.so
    0x00007f6f74b5bac0  -  0x00007f6f74b5bdf1  is  csx_gx_rt  in
/tmp/abcdt/a/564217-spa_
FNM00131203264_2013-10-11_17_14_08_8666/EMC/csx/ulib64/csx_urt.so
...
```

In this exemplary embodiment, through the query procedure above, it can be derived that a module name of the function associated with the failure is csx_urt.so, this module name information may form corresponding simplified stack frames together with the function name information csx_rt_proc_do_abort.

In order to better distinguish function name information from module name information, in some embodiments, in the simplified stack frames, separators may be set between the corresponding function name information and the corresponding module name information. For example, in a specific implementation, a symbol "!" may be used as separators. Those skilled in the art may understand that any other symbol that will not cause confusion may be used as separators between the corresponding function name information and the corresponding module name information.

In an embodiment using "!" as separators, using a function name information and a module name information, the stack frame #2 shown in FIG. 1 can be simplified into the following form: csx_urt.so!csx_rt_proc_do_abort. Those skilled in the art may understand that the specific form is only an example, and those skilled in the art may generate various different simplified stack frames by adjusting sequence of information, using different separators, or adding other variables or fixed information.

In one embodiment, for the stacks shown in FIG. 1, after performing block 201 and block 202 of the method 200, the following simplified new stack text will be derived. It explicitly shows the functions and modules involved in the stacks for crash dump. In addition, from a view of practice, blocks 201-202 of the method 200 can be performed through some automated tools/scripts.

```
libc.so.6!raise
libc.so.6!abort
csx_urt.so!csx_rt_proc_do_abort
csx_urt.so!csx_rt_assert_int_take_user_space_panic_action
csx_urt.so!csx_rt_assert_request_panic_with_info
EmcPAL.sys!EmcpalBugCheck
......
csx_urt.so!csx_rt_cpi_thread_command
csx_urt.so!csx_rt_sked_thread_wrapper
libpthread.so.0!start_thread
libc.so.6!clone
```

Next, the method 200 may proceed to block 203. In block 203, the executive body of the method 200 may determine a similarity between failures based on a similarity between simplified stacks of the failures.

Those skilled in the art may understand that a similarity between failures may be embodied by a similarity between stacks for crash dump for the failures, while stacks for crash dump includes a plurality of stack frames. After these stack frames being simplified, the variable noise information has been removed, while more crucial function name information and/or module name information are reserved. Therefore, in some embodiments, a similarity between failures may be determined by directly comparing the number of similar simplified stack frames between the simplified stacks for two failures.

Besides, those skilled in the art will recognize that stack frames in stacks for crash dump have time sequences, therefore, when determining a similarity between failures, the sequence of stack frames is considered, which can better embody the similarity between two failures.

Therefore, in some embodiments, simplified stack frames may be removed one by one from bottom towards top, until only the simplified stack frame at the top is left, a sub-stack being generated in response to one of the simplified stack frames being removed; moreover, the similarity between failures is determined based on the similarity between the simplified stacks for failures and the similarity between the sub-stacks for the simplified stacks.

An advantage of this practice is that these sub-stacks may maintain sequence information of the stacks, because calling sequence is a key branch of a code path that causes crash dump. If a certain part of a problematic code can be called by different upper-layer codes from same/different modules, the part after the problematic code probably causes similar stacks with completely identical sub-stacks. For example, the simplified stack shown above can have the following sub-stacks.

```
Substack-0: <simplified stack per se>
libc.so.6!raise
libc.so.6!abort
csx_urt.so!csx_rt_proc_do_abort
csx_urt.so!csx_rt_assert_int_take_user_space_panic_action
csx_urt.so!csx_rt_assert_request_panic_with_info
EmcPAL.sys!EmcpalBugCheck
......
csx_urt.so!csx_rt_cpi_thread_command
csx_urt.so!csx_rt_sked_thread_wrapper
libpthread.so.0!start_thread
libc.so.6!clone
SubStack-1:
libc.so.6!raise
libc.so.6!abort
csx_urt.so!csx_rt_proc_do_abort
csx_urt.so!csx_rt_assert_int_take_user_space_panic_action
csx_urt.so!csx_rt_assert_request_panic_with_info
EmcPAL.sys!EmcpalBugCheck
......
csx_urt.so!csx_rt_cpi_thread_command
csx_urt.so!csx_rt_sked_thread_wrapper
libpthread.so.0!start_thread
libc.so.6!clone
SubStack-2:
libc.so.6!raise
```

-continued

```
libc.so.6!abort
csx_urt.so!csx_rt_proc_do_abort
csx_urt.so!csx_rt_assert_int_take_user_space_panic_action
csx_urt.so!csx_rt_assert_request_panic_with_info
EmcPAL.sys!EmcpalBugCheck
......
csx_urt.so!csx_rt_cpi_thread_command
csx_urt.so!csx_rt_sked_thread_wrapper
libpthread.so.0!start_thread
libc.so.6!clone
...
...
Sub stack-29:
libc.so.6!raise
libc.so.6!abort
csx_urt.so!csx_rt_proc_do_abort
SubStack-30:
libc.so.6!raise
libc.so.6!abort
SubStack-31:
libc.so.6!raise
```

In some specific embodiments, a similarity between two failures may be determined based on the number of stack frames in the sub-stacks having a largest number of common stack frames for the stacks for crash dump. In another scenario, it is possible that two failures have the completely same simplified stack frames. Therefore, a similarity between failures may be determined based on common simplified stacks between failures or the sub-stack having a largest number of common simplified stack frames.

In some embodiments, the corresponding simplified stacks and sub-stacks for the simplified stacks for each of a plurality of failures may be obtained, and a mapping table between the simplified stacks for the plurality of failures and the plurality of failures and between the sub-stacks for the simplified stacks and the plurality of failures may be generated.

Those skilled in the art may understand, after generating such a mapping table, the mapping relation between sub-stacks and failures (i.e., crash dump) can be determined by looking up this table, thereby quickly determining how many same or similar sub-stacks there are for any two failures, and determining the sub-stack having a largest number of common stack frames for failures to determine the similarity. In some specific embodiments, the mapping table may be generated based on a Hash algorithm for a huge number of crash dumps.

Therefore, in some embodiments, simplified stacks and sub-stacks for the simplified stacks may be generated for a new failure; moreover, the simplified stacks and sub-stacks for the new failure are looked up in the mapping table so as to determine a failure having the same simplified stack or sub-stacks as the new failure.

Additionally, the simplified stacks and the sub-stacks of the new failure which are not in the mapping table may be added into the mapping table. Therefore, this mapping table may be expanded constantly with increase of the number of failures, such that a possibility of finding a previous similar failure to a subsequent failure will increase.

In a specific embodiment, simplified stacks may be first decomposed into sub-stacks, and the simplified stacks and the sub-stacks may be hashed using the hash of the list or array. Besides, a mark for crash dump may be attached to the hash list or array with the same stacks or sub-stacks. The mark for crash dump may be a crash dump name with a certain timestamp or unique serial number information for identifying the crash dump.

Then, sub-stacks for crash dumps may be hashed to group crash dumps into a hash table based on their marks for crash dump. It only needs to perform once when the system is started for the first time; afterwards, it is only needed to add the newly generated crash dump into the hash table. This process may be expressed using a Perl language as following.

```
%Stack_hash;
$Stack_Hash{$each_sub_stack} = [ dump_1, dump_2, ...]
```

By circularly passing through all dumps, an exemplary hash table for a specific dump having sub-stack 0 to sub-stack N can be described as follows.

| Sub-stack | List of crash dumps | | | | |
|---|---|---|---|---|---|
| SubStack-0 | dmp1 | dmp2 | | | |
| SubStack-1 | dmp1 | dmp2 | dmp3 | | |
| SubStack-2 | dmp1 | dmp2 | dmp3 | dmp4 | dmp5 |
| ... | ... | ... | | | |
| SubStack-N | dmp1 | dmp2 | dmp3 | dmp4 | dmp5 | ... |

As shown in the table, the less the number of stacks in a sub-stack is, the more various dumps will be associated therewith. Therefore, if a completely identical stack cannot be found, partially identical stacks (i.e., having identical sub-stacks) may be found, which have less stacks with common code path part compared with the completely identical stacks.

Besides, from a view of engineering, the query process may stop at some points which are believed already enough. For example, the query process may stop at a certain known function that shares a same code path during most of time.

Once a new dump is generated, simplified stacks of this new dump may be first looked up from the hash table to look up whether any other (a plurality of) dump(s) has (have) the same simplified stacks. If no, the sub-stacks of this new dump may be looked up from the top of the simplified stacks. In this way, an optimal matched stack can be defined by the sub-stack having the largest number of matched sub-stack frames, and a similar crash dump ranking higher may be selected in this manner.

By regarding a sub-stack as an undividable block having a sequential context, a similarity of selected similar stacks may be better embodied. Besides, through the additional module name information, the related modules may be identified and a triage rule may be defined for automatic triage.

As the sub-stack has more matched sub-stack frames, they will have more common code paths, i.e., share more similarity between stacks for dumps. Therefore, a ratio of matched code paths may be used to quantize the similarity. Besides, these hash list results can be easily saved and re-loaded into the memory for quick search, so as to determine whether any newly generated dump has exactly identical or similar stacks.

Figure 3:
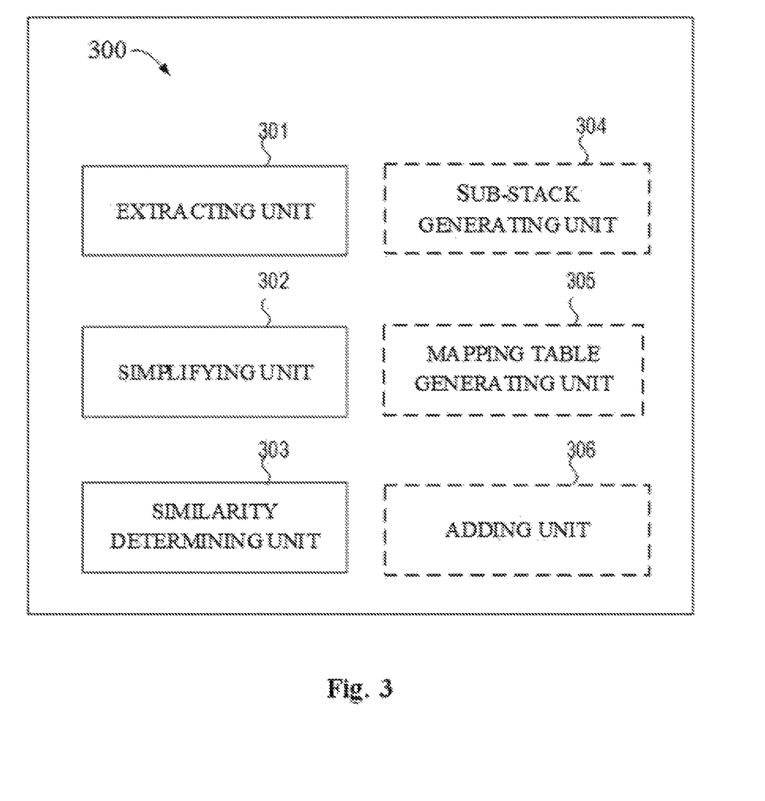
FIG. 3 schematically shows a block diagram of the apparatus according to the embodiments of the present disclosure.

FIG. 3 schematically shows a block diagram of an apparatus 300 according to the embodiments of the present disclosure. In some embodiments, the apparatus 300 may be used for a computing device. This computing device may generate a stack for crash dump in response to failures; each of stacks may include a plurality of stack frames from bottom to top; each of stack frames may include function information associated with a failure. In FIG. 3, a dotted-line block is used to represent an optional unit.

Those skilled in the art will appreciate that FIG. 3 only shows the units or components of the apparatus 300, which are closely related with the embodiments of the present disclosure. In practice, the apparatus 300 may comprise other function units or components that enable the apparatus to operate normally. Besides, those skilled in the art will also appreciate that necessary connection may exist between each unit of the apparatus 300.

As shown in FIG. 3, the apparatus 300 may comprise an extracting unit 301, a simplifying unit 302, and, a similarity determining unit 303. In some embodiments, the extracting unit 301 may be configured to extract corresponding function name information from the stack frames in the stacks; the simplifying unit 302 may be configured to generate corresponding simplified stack frames from the stack frames based on the corresponding function name information to obtain simplified stacks for the failure; and the similarity determining unit 303 may be configured to determine a similarity between the failures based on a similarity between the simplified stacks of the failures.

In some embodiments, the simplifying unit 302 may be further configured to generate the simplified stack frames only based on the corresponding function name information for the stack frames. In some embodiments, the simplifying unit 302 may be further configured to generate the corresponding simplified stack frames based on the corresponding function name information and corresponding module name information for the stack frames.

In some embodiments, the simplifying unit 302 may be further configured to extract the corresponding module name information from the stack frames, or to determine the corresponding module name information by looking up function address information in the stack frames. In some embodiments, the simplifying unit 302 may be further configured to set separators between the corresponding function name information and the corresponding module name information in the simplified stack frames.

In some embodiments, the apparatus 300 may further comprise a sub-stack generating unit 304. The sub-stack generating unit 304 may be configured to remove the simplified stack frames one by one from bottom towards top till only the simplified stack frame at the top is left, a sub-stack being generated in response to one of the simplified stack frames being removed. In these embodiments, the similarity determining unit 303 is configured to determine the similarity between the failures based on a similarity between the simplified stacks and a similarity between the sub-stacks of the simplified stacks.

In some embodiments, the simplifying unit 302 may be further configured to determine the similarity between the failures based on common simplified stacks of failures or the sub-stack of failures having a largest number of simplified stack frames.

In some embodiments, the simplifying unit 302 may be further configured to obtain simplified stacks and sub-stacks of simplified stacks for a plurality of failures. In these embodiments, the apparatus 300 may further comprise a mapping table generating unit 305. The mapping table generating unit 305 may be configured to generate a mapping table between the simplified stacks for the plurality of failures and the plurality of failures, and between the sub-stacks and the plurality of failures.

In some embodiments, the simplifying unit 302 may be further configured to obtain simplified stacks and sub-stacks of the simplified stacks for a new failure. In these embodiments, the similarity determining unit 303 may be further configured to search for the simplified stacks and the sub-stacks of the simplified stacks for the new failure from the mapping table to determine a failure having a same simplified stack or sub-stack as the new failure.

In some embodiments, the apparatus 300 may further comprise an adding unit 306. The adding unit 306 may be configured to add into the mapping table a simplified stack and sub-stack of the new failure that is missed in the mapping table.

In some embodiments, the mapping table generating unit 305 may be further configured to generate the mapping table using a Hash algorithm.

Besides, those skilled in the art will appreciate that the method according to the embodiments of the present disclosure actually utilizes a strict sequential order of the code path included in a stack for crash dump, the method proposed in the embodiments of the present disclosure can also be extended to other serial events having a strict sequential order to quickly find whether a series of events are similar to another series of events. Generally each stack frame in the embodiments of the present disclosure may be regarded as an event.

Figure 4:
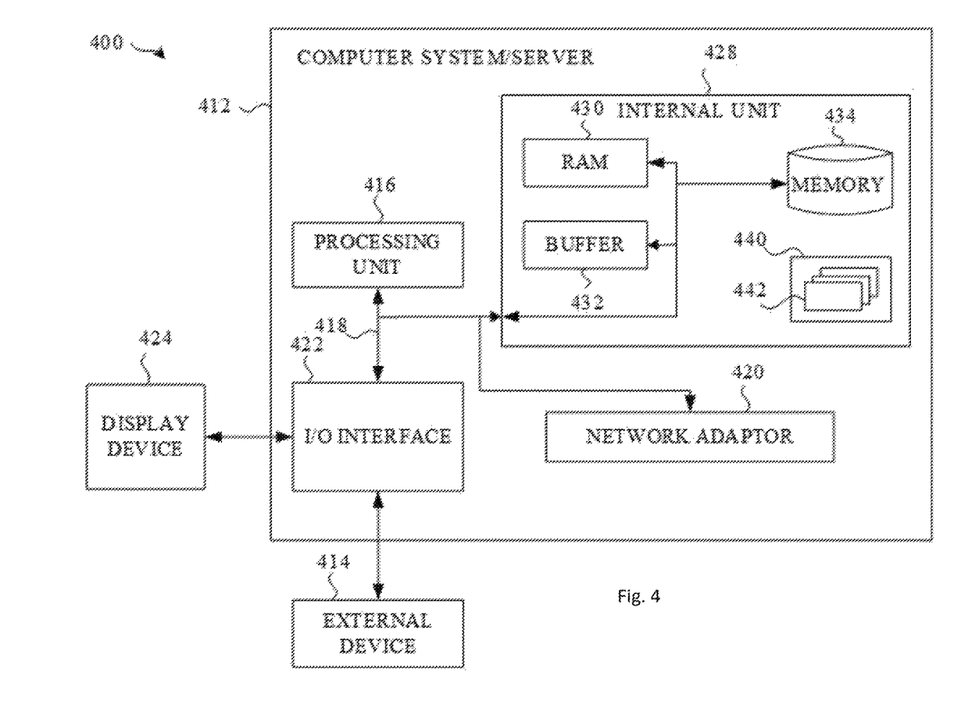
FIG. 4 schematically shows a block diagram of an exemplary computer system/server that may be used to implement the embodiments of the present disclosure.

FIG. 4 schematically shows a block diagram of an exemplary computer system/server that may be used to implement the embodiments of the present disclosure. It should be noted that the computer system/server 412 shown in FIG. 4 is only an example, which should not make any limitation to the functions and use scope of the embodiments of the present disclosure.

As shown in FIG. 4, a computer system/server 412 is embodied in a form of a general purpose computing device. Components of the computer system/server 412 may include, but not limited to: one or more processors or processing units 416, a system memory 428, and a bus 418 connecting different system components (including the system memory 428 and the processing unit 416).

The bus 418 represents one or more of several bus structures, including a memory bus or a memory controller, a periphery bus, a graphical acceleration port, a processor or a local bus using any bus structure in a plurality of different bus structures. For example, these architectures include, but not limited to, an Industry Standard Architecture (ISA) bus, a Micro Channel Architecture (MAC) bus, an enhanced ISA bus, a Video Electronics Standard Association (VESA) local bus, and a Peripheral Component Interconnect (PCI) bus.

The computer system/server 412 typically includes a plurality of computer system readable mediums. These mediums may be any available medium accessible by the computer system/server 412, including volatile and non-volatile mediums, removable and irremovable mediums.

The system memory 428 may include a computer system readable medium in a volatile memory form, e.g., a memory 430 and/or a buffer 432. The computer system/server 412 may further comprise other removable/irremovable, volatile/non-volatile computer system storage mediums. Although not shown in FIG. 4, a magnetic disk for reading and writing a removable non-volatile magnetic disk (e.g., "floppy disk") and an optical disk for reading and writing a removable non-volatile optical disk (e.g., CD-ROM. DVD-ROM or other optical medium) may be provided. In these cases, each magnetic disk may be connected with the bus 418 via one or more data media interfaces. The memory 428 may include at least one program product, and the program product has a group (e.g., at least one) of program modules. These program modules are configured to execute functions of each implementation of the present disclosure.

A program/utility tool 440 having at least one program module 442 may be stored for example in a memory 428.

Such program module 442 includes, but not limited to: an operating system, one or more application programs, other program modules and program data. Each or certain combination of these examples may include implementation of a network environment. The program module 422 generally performs functions and/or methods in the implementations described in the present disclosure.

As needed, the computer system/server 412 may also communicate with one or more external devices (e.g., a display device 424, a storage device 414, etc.), and may also communicate with one or more devices that enable a user to interact with the computer system/server 412, and/or communicate with any device (e.g., a network card, a modem, etc.) that enables the computer system/server 412 to communicate with one or more of other computing devices. This communication may proceed via an input/output (I/O) interface 422. Moreover, the computer system/server 412 may also communicate with one or more of networks (e.g., a local area network (LAN), a wide area network (WAN) and/or public network, e.g., the Internet) via a network adaptor 420. As shown in the figure, the network adaptor 420 communicates with other modules of the computer system/server 412 via the bus 418. It should be understood that although not shown in the figure, other hardware and/or software modules may be used in conjunction with the computer system/server 412, including but not limited to: a microcode, a device disk, a redundancy processing unit, an external magnetic disk driving array, a RAID system, a magnetic tape, a magnetic disk, and a data backup storage system, etc.

In a description of the embodiments of the present disclosure, the term "comprise/include" and the similar expression should be understood as open inclusion, i.e., "including, but not limited to." The term "based on" should be understood as "at least partially based on." The term "one embodiment" or "the embodiment" should be understood as "at least one embodiment."

It should be noted that the embodiments of the present disclosure may be implemented by hardware, software or a combination thereof. The hardware part may be implemented using a specific logic; the software part may be stored in a memory and executed by an appropriate instruction executing system, e.g., a microprocessor or a specific designed hardware. Those skilled in the art may understand that the apparatus and method above may be implemented using a computer executable instruction and/or by being embodied in a processor control code, e.g., such code is provided in a programmable memory or in a data carrier, such as an optical or electronic signal carrier.

Besides, although operations of the method of the present disclosure are described in a specific order in the drawings, it does not necessarily require or imply that to achieve a desired result, these operations have to be executed according to the specific order or all of the illustrated operations have to be executed. On the contrary, blocks described in the flow diagrams may change the execution order. Additionally or alternatively, some blocks may be omitted; a plurality of blocks may be combined into one block for execution, and/or a block may be decomposed into a plurality of blocks for execution. It should also be noted that features and functions of two or more apparatuses of the present disclosure may be embodied in one apparatus. In turn, features and functions of one apparatus described above may be further divided into a plurality of apparatuses to be embodied.

Although the present disclosure has been described with reference to a number of specific embodiments, it should be understood that the present disclosure is not limited to the specific embodiments as disclosed. The present disclosure intends to cover various modifications and equivalent arrangements included within the spirit and scope of the appended claims.

What is claimed is:

1. A method implemented in a computing device, the computing device generating stacks for crash dump in response to failures, each of the stacks including a plurality of stack frames from bottom to top, and each of the stack frames including function information associated with a corresponding failure, the method comprising:
    extracting corresponding function name information from the stack frames in the stacks;
    generating simplified stack frames from the stack frames based on the corresponding function name information to obtain simplified stacks for the failures; and
    determining a similarity between the failures based on a similarity between the simplified stacks for the failures by:
        removing the simplified stack frames one by one from the simplified stack from bottom towards top till only a simplified stack frame at the top is left, a sub-stack being generated in response to one of the simplified stack frames being removed;
        determining the similarity between the failures based on a similarity between the simplified stacks and a similarity between the sub-stacks of the simplified stacks;
        obtaining simplified stacks and sub-stacks of the simplified stacks for a plurality of failures; and
        generating a mapping table between the plurality of failures and the simplified stacks for the plurality of failures and between the plurality of failures and the sub-stacks.

2. The method according to claim 1, wherein generating simplified stack frames based on the corresponding function name information for the stack frames comprises:
    generating the simplified stack frames only based on the corresponding function name information for the stack frames.

3. The method according to claim 1, wherein generating simplified stack frames based on the corresponding function name information for the stack frames comprises:
    generating the simplified stack frames based on the corresponding function name information and corresponding module name information for the stack frames.

4. The method according to claim 3, further comprising:
    extracting the corresponding module name information from the stack frames, or
    determining the corresponding module name information by looking up function address information in the stack frames.

5. The method according to claim 3, further comprising:
    setting separators between the corresponding function name information and the corresponding module name information in the simplified stack frames.

6. The method according to claim 1, further comprising:
    determining the similarity between the failures based on common simplified stacks of the failures or the sub-stacks of the failures having a largest number of common simplified stack frames.

7. The method according to claim 1, wherein determining a similarity between the failures based on a similarity between the simplified stacks comprises:
    obtaining simplified stacks and sub-stacks of the simplified stacks for a new failure; and searching for the simplified stacks and the sub-stacks of the simplified stacks for the new failure from the mapping table to determine a failure having a same simplified stack or sub-stack as the new failure.

8. The method according to claim 7, further comprising: adding into the mapping table a simplified stack or a sub-stack for the new failure that is missed in the mapping table.

9. The method according to claim 1, further comprising: generating the mapping table using a Hash algorithm.

10. An apparatus for a computing device, the computing device generating stacks for crash dump in response to failures, each of the stacks including a plurality of stack frames from bottom to top, and each of the stack frames including function information associated with a corresponding failure, the apparatus comprising at least one processor; and at least one memory comprising program module, wherein the at least one memory and the program modules are configured, with the at least one processor, configured to:

extract, by an extracting unit, corresponding function name information from the stack frames in the stacks;

generate, by a simplifying unit, simplified stack frames from the stack frames based on the corresponding function name information to obtain simplified stacks for the failures;

determine, by a similarity determining unit, a similarity between the failures based on a similarity between the simplified stacks for the failures;

removing, by a sub-stack generating unit, the simplified stack frames one by one from the simplified stack from bottom towards top till only a simplified stack frame at the top is left, a sub-stack being generated in response to one of the simplified stack frames being removed; and wherein the similarity determining unit is further configured to determine the similarity between the failures based on a similarity between the simplified stacks and a similarity between the sub-stacks of the simplified stacks.

11. The apparatus according to claim 10, wherein the simplifying unit is configured to:

generate the simplified stack frames only based on the corresponding function name information for the stack frames.

12. The apparatus according to claim 10, wherein the simplifying unit is configured to:

generate the simplified stack frames based on the corresponding function name information and corresponding module name information for the stack frames.

13. The apparatus according to claim 12, wherein the simplifying unit is further configured to:

extract the corresponding module name information from the stack frames, or determine the corresponding module name information by looking up function address information in the stack frames.

14. The apparatus according to claim 12, wherein the simplifying unit is further configured to:

set separators between the corresponding function name information and the corresponding module name information in the simplified stack frames.

15. The apparatus according to claim 10, wherein the simplifying unit is configured to:

determine the similarity between the failures based on common simplified stacks of the failures or the sub-stacks of the failures having a largest number of common simplified stack frames.

16. The apparatus according to claim 10, wherein the simplifying unit is further configured to obtain simplified stacks and sub-stacks of the simplified stacks for a plurality of failures; and wherein the apparatus further comprises a mapping table generating unit configured to generate a mapping table between the plurality of failures and the simplified stacks for the plurality of failures and between the plurality of failures and the sub-stacks.

17. The apparatus according to claim 16, wherein the simplifying unit is further configured to obtain simplified stacks and sub-stacks of the simplified stacks for a new failure; and wherein the similarity determining unit is further configured to search for the simplified stacks and the sub-stacks of the simplified stacks for the new failure from the mapping table to determine a failure having a same simplified stack or sub-stack as the new failure.

* * * * *